(12) United States Patent
Graf

(10) Patent No.: US 10,777,980 B2
(45) Date of Patent: Sep. 15, 2020

(54) SWITCHGEAR-CONTACTING DEVICE

(71) Applicant: ABB Schweiz AG, Baden (CH)

(72) Inventor: Alexander Graf, Mannheim (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/576,821

(22) Filed: Sep. 20, 2019

(65) Prior Publication Data

US 2020/0014179 A1 Jan. 9, 2020

Related U.S. Application Data

(63) Continuation of application No. PCT/EP2018/055322, filed on Mar. 5, 2018.

(30) Foreign Application Priority Data

Mar. 21, 2017 (DE) .................. 10 2017 002 705

(51) Int. Cl.
 *H02B 11/24* (2006.01)
 *H01H 1/58* (2006.01)

(52) U.S. Cl.
 CPC ........... *H02B 11/24* (2013.01); *H01H 1/5866* (2013.01)

(58) Field of Classification Search
 CPC .............................. H02B 11/24; H01H 1/5866
 USPC ....... 439/200, 181, 186, 243, 247, 319, 513, 439/664, 667, 700, 743, 824, 837, 847, 439/867
 See application file for complete search history.

(56) References Cited

U.S. PATENT DOCUMENTS

| | | | | | |
|---|---|---|---|---|---|
| 5,466,164 | A | * | 11/1995 | Miyazaki | H01R 13/4538 439/140 |
| 5,518,410 | A | * | 5/1996 | Masami | H01R 13/2485 324/750.25 |
| 6,072,161 | A | * | 6/2000 | Stein | A47G 19/2288 219/386 |
| 6,176,712 | B1 | * | 1/2001 | Huang | H01R 13/4538 439/140 |
| 6,923,688 | B1 | * | 8/2005 | Burson | H01R 13/2421 439/218 |

(Continued)

FOREIGN PATENT DOCUMENTS

| | | |
|---|---|---|
| DE | 69411420 T2 | 11/1998 |
| EP | 2211426 A1 | 7/2010 |

(Continued)

*Primary Examiner* — Harshad C Patel
(74) *Attorney, Agent, or Firm* — Leydig, Voit & Mayer, LTD.

(57) ABSTRACT

A switchgear contact device includes at least one first contact element and at least one second contact element which can be slid inside each other in a positive-locking manner, such that they can be connected to each other in an electrically conductive manner in order to create an electrically conductive connection. The at least one first contact element includes a first cup-like contact sleeve and the at least one second contact element includes a contact pin that is surrounded by a hollow cylinder-like enclosure and is centrally arranged therein. A peripheral free area is provided between the contact pin and the enclosure which can be closed on the front side by an annular stop on which a force is exerted and which is arranged such that it is displaceable in the axial direction of the contact pin.

7 Claims, 4 Drawing Sheets

(56) References Cited

U.S. PATENT DOCUMENTS

| | | | | |
|---|---|---|---|---|
| 7,384,287 B2* | 6/2008 | Hughes | ............... | H01H 9/085 |
| | | | | 439/181 |
| 7,465,117 B2* | 12/2008 | Al-Khazraji | ............ | B43K 1/082 |
| | | | | 401/215 |
| 7,670,162 B2* | 3/2010 | Hughes | ............... | H01R 13/53 |
| | | | | 439/187 |
| 7,731,514 B2* | 6/2010 | Hughes | ............... | H01H 9/085 |
| | | | | 439/181 |
| 7,828,605 B1* | 11/2010 | Tang | ............... | H01R 13/2421 |
| | | | | 439/700 |
| 7,909,660 B2* | 3/2011 | Tsunoda | ............ | H01R 12/714 |
| | | | | 439/700 |
| 7,938,663 B2* | 5/2011 | Leipold | ............ | H01R 9/05 |
| | | | | 439/322 |
| 7,946,870 B2* | 5/2011 | Hughes | ............ | H01R 13/187 |
| | | | | 439/181 |
| 7,963,783 B2* | 6/2011 | Hughes | ............... | H01R 31/08 |
| | | | | 439/187 |
| 8,029,324 B1* | 10/2011 | Yi | ............... | H01R 13/4367 |
| | | | | 439/745 |
| 2009/0221189 A1* | 9/2009 | Xu | ............... | H01R 13/2421 |
| | | | | 439/700 |

FOREIGN PATENT DOCUMENTS

| | | |
|---|---|---|
| JP | 2005056617 A | 3/2005 |
| JP | 2014053127 A | 3/2014 |

* cited by examiner

SWITCHGEAR-CONTACTING DEVICE

CROSS-REFERENCE TO RELATED APPLICATIONS

The present application is a continuation of International Application No. PCT/EP2018/055322, which was filed on Mar. 5, 2018 and is hereby incorporated by reference herein. The International Application claims priority to German Patent Application No. DE 102017002705.6, which was filed on Mar. 21, 2017 and is hereby incorporated by reference herein.

FIELD

The present invention relates to a switchgear contact device for electrically connecting a switchgear module or insert to at least one busbar of a switchgear, in particular a low-voltage switchgear.

BACKGROUND

In the case of known contact devices, a contact pin and a contact sleeve generally engage in one another during contact, wherein the contact connection is effected by sliding the respective switchgear module into the switchgear. If the respective module is slid into the switchgear too quickly, the contact connection may trigger or activate individual electrical devices and devices within the module, or they may even be lost or fail.

Furthermore, when sliding the respective module into the switchgear, mechanical loadings of the contact device, for example in the manner of shearing forces on the contact pin, can occur, which can ultimately lead to deformation and/or damage of the contact pin and/or contact sleeve.

SUMMARY

In an embodiment, the present invention provides a switchgear contact device including at least one first contact element and at least one second contact element which can be slid inside each other in a positive-locking manner, such that they can be connected to each other in an electrically conductive manner in order to create an electrically conductive connection. The at least one first contact element includes a first cup-like contact sleeve and the at least one second contact element includes a contact pin that is surrounded by a hollow cylinder-like enclosure and is centrally arranged therein. A peripheral free area is provided between the contact pin and the enclosure which can be closed on the front side by an annular stop on which a force is exerted and which is arranged such that it is displaceable in the axial direction of the contact pin. In an embodiment, the free area, the inner and outer diameters of the sleeve, the pin diameter and inner width of the enclosure are matched to one another in such a way that during the displacement of the annular stop, the contact sleeve engages with the pin above and in the free area in order to complete the contacting process.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
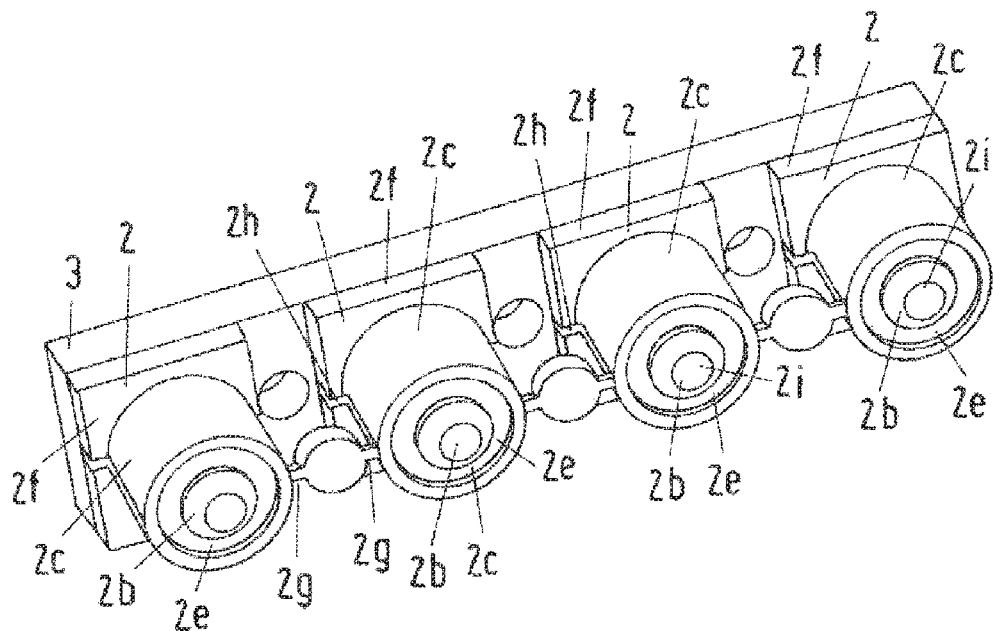
FIG. 1 shows, by way of example, second contact elements, formed according to an embodiment of the invention, of a four-pole contact device in a 3D oblique view.

In order to avoid the aforementioned disadvantages of known devices, an embodiment of the invention is based on the object of providing an improved contact connection possibility for securely and controllably establishing an electrical connection of a switchgear module to the busbar of a switchgear.

In an embodiment, a contact device according to the invention comprises at least one first contact element and at least one second contact element, which can be slid inside each other in particular in a positive-locking manner such that they can be connected to each other in an electrically conductive manner in order to create an electrically conductive connection.

In an embodiment, the at least one first contact element comprises a first cup-like contact sleeve and the at least one second contact element comprises one contact pin that is surrounded by a hollow cylinder-like enclosure and is centrally arranged therein. In an embodiment, a peripheral free area is provided between the contact pin and the enclosure which can be closed on the front side by an annular stop on which a force is exerted and which is arranged such that it is displaceable in the axial direction of the contact pin. In an embodiment, the free area, the inner and outer diameters of the sleeve, the pin diameter and the inner width of the enclosure are matched to one another in such a way that during the displacement of the annular stop, the contact sleeve engages with the pin above and in the free area in order to complete the contacting process.

An embodiment of the invention is based on the idea of integrating a stop into the contact device in order to form a compact and stable closure system of the inner contact region of the second contact element which can be formed with comparatively little effort.

In this case, it can advantageously be provided that the respective contact element has a contact housing, preferably made of electrically non-conductive plastic.

Furthermore, it can be provided that the enclosure of the second contact element is formed as part of the housing, in particular from electrically non-conductive or insulating plastic.

In an advantageous embodiment, at least one, (e.g., two) guide elements for guiding and/or holding the annular stop are integrated into the housing and/or the enclosure of the second contact element, wherein the annular stop has complementary guide means for this purpose, for example in the manner of one or a plurality of pins.

The at least one guide element can be, for example, one or two grooves or recesses which are arranged over the inner circumferential surface of the enclosure and are introduced into the enclosure and extend in the axial direction and/or a projection which runs radially around in the direction of the contact pin.

In an advantageous embodiment, the at least one guide element comprises two axially extending grooves or slots provided opposite each other in the enclosure of the second contact element so that the respective annular stop has complementarily shaped formations, for example pins, which are guided in the corresponding grooves or slots.

A further embodiment of a second contact element advantageously has an annular stop integrated into the contact element housing and guided therethrough, a contact pin with an insulated contact pin tip, an enclosure formed by the housing, and at least one spring used to apply force to the annular stop.

The contact housing can advantageously assume a plurality of functional tasks. In this way, it can serve both for guiding and aligning the contact sleeve and for protecting the contact pin. A spring held under prestress can be provided within the housing so that the annular stop arranged in the free area between the pin and the enclosure can only be displaced with a predeterminable force applied and/or the contact connection between the first and second contact element can be effected. The predeterminable force to be overcome for displacing the annular stop, for example 4 to 6 newtons, also serves to maintain the IP4x standard or the corresponding standard. Even without a functioning stop or with significantly lower prestressing or application of force, for example in the range of 1 newton, the contact device would still fulfill the protective function according to IP2x.

A switchgear contact device can also have a plurality of first contact elements arranged next to one another on the module side and a plurality of second contact elements arranged complementarily next to one another on the busbar side.

Advantageously, the respective adjacent contact elements can be arranged floating in a corresponding mounting frame in order to facilitate the joining and interlocking of respective first and second contact elements when sliding the respective module into the switchgear and establishing a contact connection, and to reduce the wear.

When the corresponding switchgear module is installed in the respective switchgear, the stop of the second contact element is opened and/or displaced by the first contact element and thus the contact sleeve during installation or insertion in the installed position or until the end position.

Due to the applied spring force, the respective switchgear module is decelerated during the insertion process, as a result of which the risk of mechanical damage due to too rapid insertion and the undesired triggering of individual modules or individual components within the respective module can be avoided or at least largely reduced.

Furthermore, the stop advantageously also exerts a kind of protective function for the contact pin, since the latter is protected by the annular stop against radial force, in particular when establishing the contact connection. Furthermore, the contact pin is protected by the stop from contamination, for example from flowing gas and/or salt mist.

It has furthermore been recognized according to an embodiment of the invention that by integrating the annular stop into the housing and through force, in particular spring loading, no separate opening mechanism must be provided to release the contact pin.

The contact pin is released and the stop is opened by sliding in the respective switchgear module. The closing of the stop is effected by the spring. Only a few mechanical parts, in particular movable mechanical parts, are involved which can wear out and/or be damaged by mechanical stress, as a result of which the mechanical wear can be significantly reduced and the risk of failure can be significantly increased.

In an advantageous embodiment, the respective second contact element can alternatively also be formed without a spring or spring element, wherein means are then provided by which the module releases and/or opens the stop during insertion and, when removed from the switchgear, the stop follows the movement of the module and closes the free area during module removal. For example, the means of the invention could comprise one or more threads and/or magnets. By using one or more threads, the pressing force which would be required to open or move the stop and to insert the respective switchgear module could be significantly increased. The removal of the module and thus also the closing of the stop could be carried out in a corresponding opposite path.

In particular, the first few millimeters of the path could help meet the IP requirements. Frictional forces would continue to occur due to the thread, wherein the size or strength of the frictional forces depend on the dimensions, in particular the pitch, of the thread.

The means could also comprise, for example, a driver, in particular in the manner of a plastic hook or nose which can be used several times, in particular one to two times, and which is moved accordingly by the module during the insertion and/or removal process.

Furthermore, it can be provided that an individual, separate stop is provided for each second contact element, or a stop arrangement comprising three to four poles or three to four second contact elements is provided in the case of a multi-pole embodiment.

The stop movement or opening and closing can be effected individually for or by each contact element separately or the respective module as a whole.

Advantageously, instead of a ring, the stop can also have a different geometry. Furthermore, sealing means for achieving a higher protection class can be provided between the stop and the contact pin and/or enclosure.

If a spring for applying force to the stop is used, the spring tension over the entire length can be as high as required according to IEC60529 IP, so that an external or additional locking can be dispensed with in accordance with IP3x and IP4x.

Advantageously, the element for applying force to the stop, in particular a spring, can be arranged inside the enclosure or contact element housing or outside the enclosure or contact element housing.

In FIG. 1, the busbar-side part of a four-pole switchgear contact device designed according to an embodiment of the invention, in particular a low-voltage switchgear contact device, is shown which accordingly has four second contact elements (2) which comprises one contact pin (2b) that is surrounded by a hollow cylinder-like enclosure (2c) and is centrally arranged therein, and wherein a peripheral free area (2d) is provided between the contact pin (2b) and the enclosure (2c) and can be closed on the front side by an annular force-loaded stop (2e) arranged displaceably in the axial direction of the contact pin (2b).

The respective contact element (2) has a contact element housing (20, preferably made of electrically non-conductive plastic.

The enclosure (2c) of the respective second contact element (2) is embodied here, by way of example, as part of the housing (20, in particular made of electrically non-conductive or electrically insulating plastic.

The four second contact elements (2) can be arranged floating or easily movable with play on a corresponding carrier (3).

In an advantageous embodiment, two guide elements for guiding and/or holding the annular stop (2e) are integrated into the housing (20 and/or the enclosure (2c) of the respective second contact element (2), wherein the annular stop (2e) has complementary guide means for this purpose, for example in the manner of two pins (2g).

In this case, the guide elements are opposite recesses or slots (2h) which extend in the axial direction and are introduced into the enclosure.

In the embodiment shown here, the individual stops (2e) are combined and connected via connecting elements (4) to form a stop arrangement spanning all four poles.

The contact pin provided in each second contact element (2) also has an electrically insulated tip (2i), wherein the insulation is formed by means of an electrically insulating plastic, such as, for example, polyamide.

Figure 2:
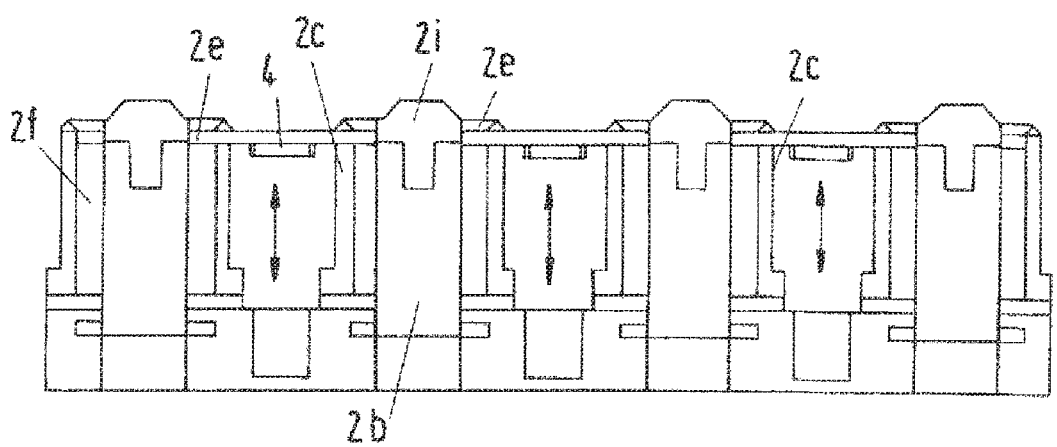
FIG. 2 shows, by way of example, second contact elements, formed according to an embodiment of the invention, of a four-pole contact device with an outside force element in a sectional view.

As can be seen more clearly in FIG. 2, a force element (not explicitly shown in the figure), for example a spring, can be provided in each case between the individual contact elements, said force element closing the stop arrangement under pretension and thus closing the stops and holding the free area closed therewith.

Figures 3A, 3B:
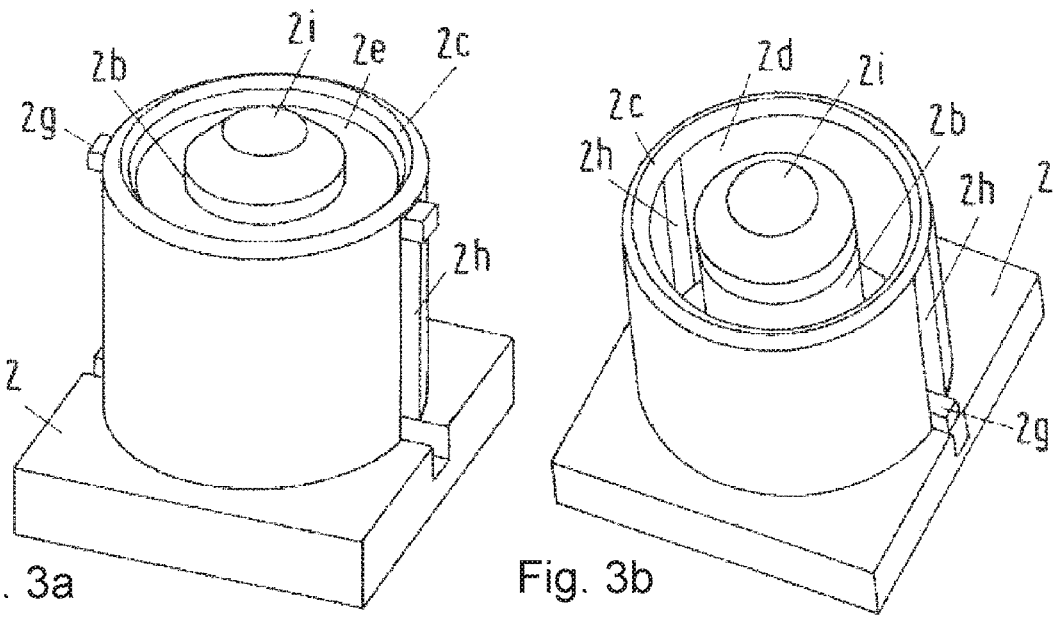
FIG. 3a shows, by way of example, a second contact element formed according to an embodiment of the invention with a closed stop in a 3D oblique view.
FIG. 3b shows, by way of example, a second contact element formed according to an embodiment of the invention with an open stop in a 3D oblique view.

In FIGS. 3a and 3b there is, by way of example, a second contact element (2) formed according to an embodiment of invention which comprises a contact pin (2b) with an electrically insulated tip (2i) that is surrounded by a hollow cylinder-like enclosure (2c) and is centrally arranged therein, and wherein a peripheral free area (2d) is provided between the contact pin (2b) and the enclosure (2c) which can be closed on the front side by an annular stop (2e) on which a force is exerted and which is arranged such that it is movable in the axial direction of the contact pin (2b). At least one spring (2j) arranged within the enclosure in the free area or free space (2d) is provided as a force element for applying force.

The respective contact element (2) has a contact element housing (20, preferably made of electrically non-conductive plastic.

The enclosure (2c) of the second contact element (2) shown is designed here, by way of example, as part of the housing (20, in particular made of electrically non-conductive or electrically insulating plastic.

Two slit-like guide elements (2h) extending axially for guiding and/or holding the annular stop (2e) are integrated into the housing (20 and/or the enclosure (2c) of the second contact element (2) shown, wherein the annular stop (2e) has complementary guide means for this purpose in the manner of two pins (2g) which project through the axially extending guide elements (2k).

Figures 4A, 4B:
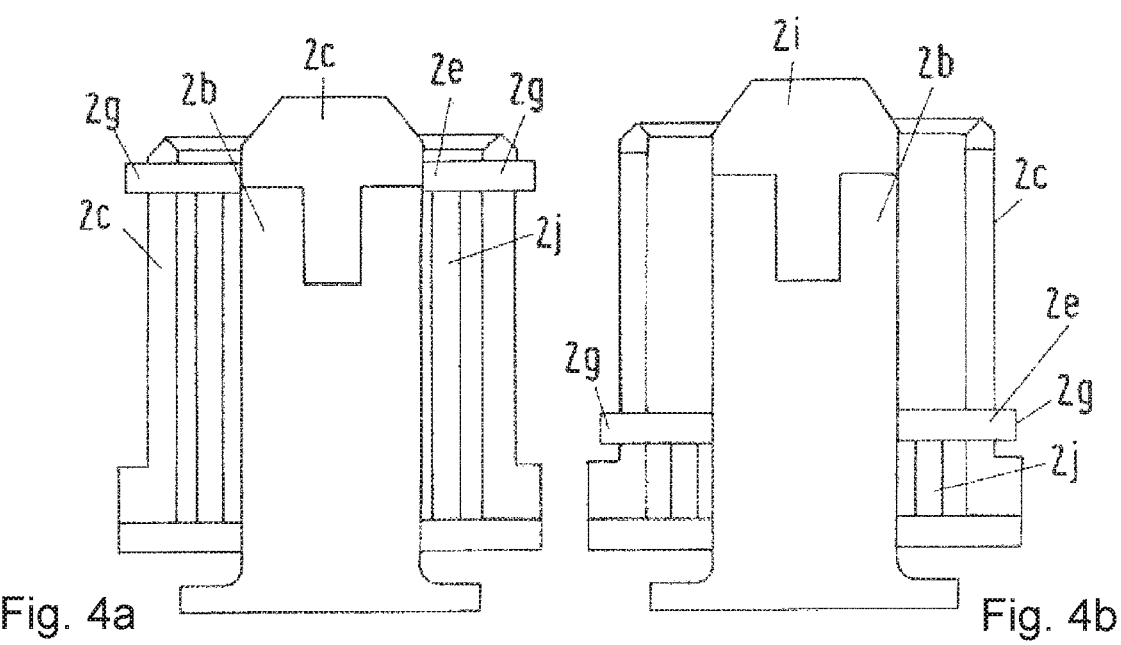
FIG. 4a shows, by way of example, a second contact element formed according to an embodiment of the invention with a closed stop in a sectional view.
FIG. 4b shows, by way of example, a second contact element formed according to an embodiment of the invention with an open stop in a sectional view.

FIG. 3a shows the second contact element with the stop closed and FIG. 3b with the open stop pushed back. A corresponding sectional view is represented by FIG. 4a with a closed stop and FIG. 4b with an open stop. Since all four figures in principle show the same features, reference is made with regard to FIGS. 4 a,b to the description of FIGS. 3 a,b.

Figure 5:
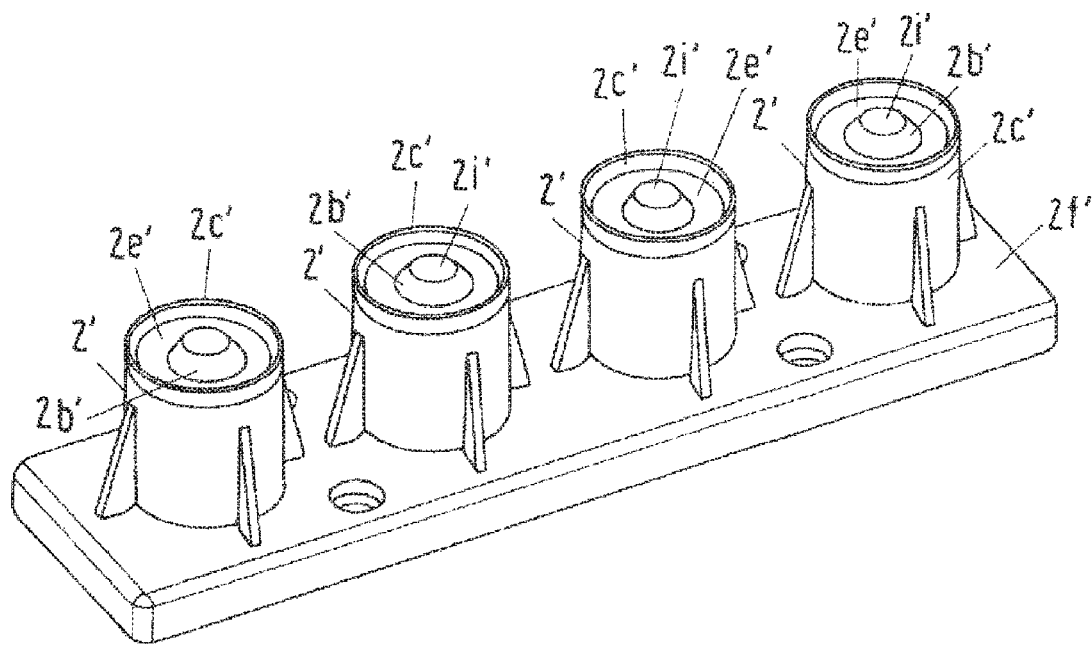
FIG. 5 shows, by way of example, a busbar-side four-pole contact device formed according to an embodiment of the invention with four second contact elements in a housing in a 3D oblique view.

In FIG. 5, the busbar-side part of a four-pole switchgear contact device according to an embodiment of the invention, in particular a low-voltage switchgear contact device, is shown, which accordingly has four second contact elements (2') arranged in a common housing (2f), each of which comprises a contact pin (2b') with an electrically insulated or insulating tip surrounded by a hollow cylinder-like enclosure (2c') and arranged centrally therein, and wherein a peripheral free area (2d') is provided between the contact pin (2b) and the enclosure (2c') which can be closed on the end side by an annular stop (2e') on which a force is exerted and which is arranged such that it is movable in the axial direction of the contact pin (2b').

The housing (2f) is preferably formed from electrically non-conductive plastic. The enclosure (2c') of the respective second contact element (2') is designed here, by way of example, as part of the housing (2f).

At least two guide elements in the form of grooves (2h') for guiding and/or holding the annular stop (2e') are integrated into the housing (2f) and/or the enclosure (2c') of the respective second contact element (2'), wherein the annular stop (2e') has complementary guide means for this purpose, for example in the manner of two formed pins (2g').

In this case, the guide elements are opposite recesses or grooves (2h') which extend in the axial direction and are introduced into the enclosure.

In the embodiment shown here, the individual stops (2e') are not connected and can be closed or opened or moved independently of one another.

The contact pin provided in each individual second contact element (2') also has an electrically insulated tip (2i'), wherein the insulation is formed by means of an electrically insulating plastic, such as, for example, polyamide.

In the embodiment shown here, one force element (not explicitly shown in the figure), for example a spring in the free area, can be provided in each case which closes the stop arrangement under pretension and thus the respective stop (2e') and keeps the free area closed therewith.

Figure 6:
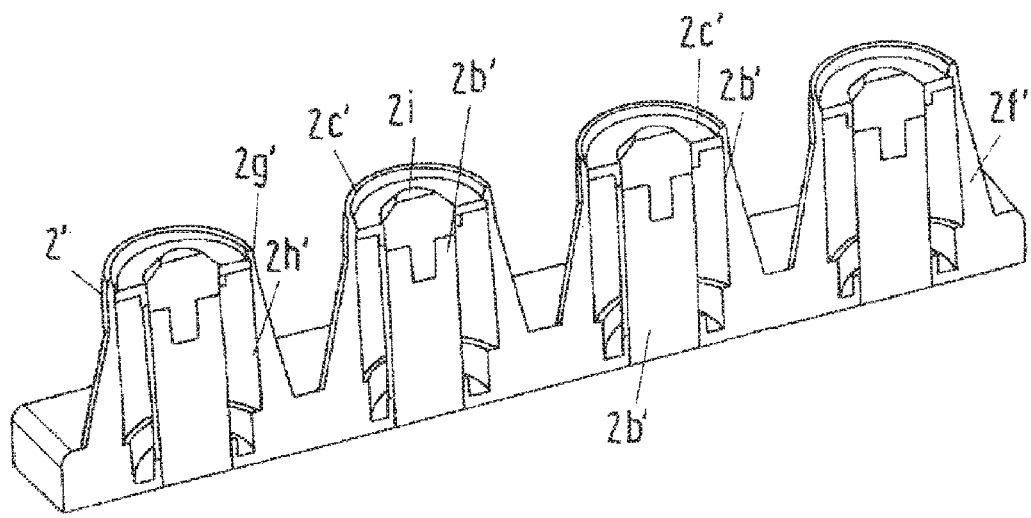
FIG. 6 shows, by way of example, a busbar-side contact device formed according to an embodiment of the invention with four second contact elements in a housing in a 3D sectional view.

A corresponding sectional view of the embodiment shown in FIG. 5 is represented by FIG. 6. Since both figures basically show the same features, reference is made with regard to FIG. 6 to the description of FIG. 5.

Figure 7:
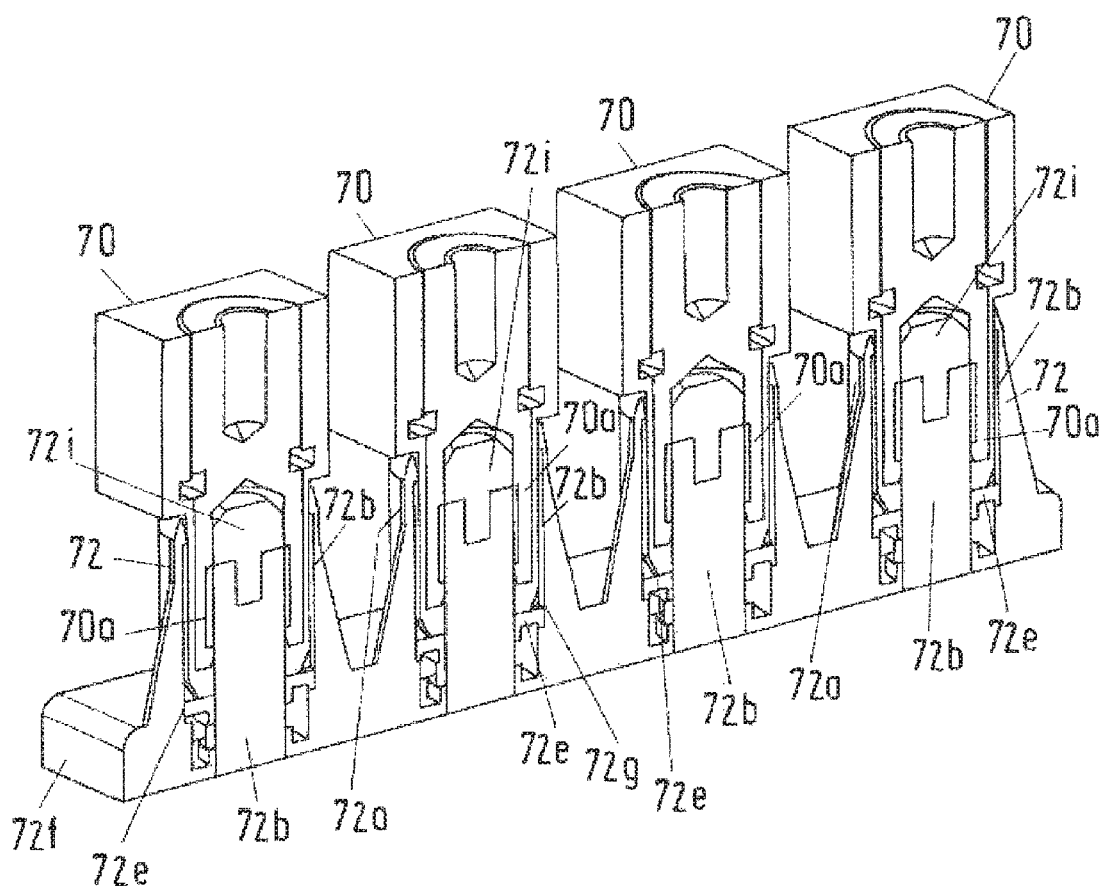
FIG. 7 shows, by way of example, a four-pole contact device formed according to an embodiment of the invention with four first and four second contact elements in a 3D sectional view.

FIG. 7 shows an exemplary contact device according to the invention having four module-side first contact elements (70) and four busbar-side second contact elements (72) which can be slid into one another, in particular in a positive-locking manner, to effect an electrically conductive connection and can thereby be electrically conductively connected to one another.

In an embodiment, the respective first contact element (70) comprises a first cup-like contact sleeve (70a) and the at least one second contact element (72) comprises one contact pin (72b) that is surrounded by a hollow cylinder-like enclosure (72a) and is arranged centrally therein, and wherein a peripheral free area (72c) is provided between the contact pin and the enclosure which can be closed on the front side by an annular stop (72e) on which a force is exerted and which is arranged such that it is movable in the axial direction of the contact pin, and wherein the free area (72c), the inner and outer diameters of the sleeve, the pin diameter and the inner width of the enclosure (72a) are matched to one another in such a way that during the displacement of the annular stop (72e), the contact sleeve (70a) engages with the pin (72b) above and in the free area (72c) in order to complete the contacting process.

The second contact elements have a housing (720 made of preferably electrically non-conductive plastic. The enclosure (72a) of the respective second contact element (72) is formed here, by way of example, as part of the housing (720.

At least two guide elements in the form of grooves (72h) for guiding and/or holding the annular stop (72e) are integrated into the housing (720 and/or the enclosure (72a) of the respective second contact element (72), wherein the annular stop (72e) has complementary guide means for this purpose, for example in the manner of two formed pins (72g).

In this case, the guide elements are opposite recesses or grooves (72h) which extend in the axial direction and are introduced into the enclosure.

In the embodiment shown here, the individual stops (72e) are not connected and can be closed or opened or moved independently of one another.

The contact pin (72b) provided in each individual second contact element (72) also has an electrically insulated tip (72i), wherein the insulation is formed by means of an electrically insulating plastic, such as, for example, polyamide.

In the embodiment shown here, one force element (not explicitly shown in the figure), for example a spring in the free area, can be provided in each case which closes the respective stop (72e) under pretension and thus in the rest position and keeps the free area closed therewith. Only when the module is slid into the switchgear and the contact sleeve of the first contact element engages in the free space of the second contact element is the stop moved and opened along the displacement path by the applied force of the first contact element and the contact pin released for contact connection.

An embodiment of the invention is a switchgear-contacting device, particularly for a low-voltage switchgear, comprising at least one first contact element and at least one second contact element, which can be slid inside each other in a particularly positive manner such that they can be connected to each other in an electroconductive manner, in order to create an electroconductive connection, the at least one first contact element comprising a first cup-type contact sleeve and the at least one second contact element comprising a contact pin that is surrounded by an enclosure in the form of a hollow cylinder and is centrically arranged therein, and a peripheral free area being provided between the contact pin and the enclosure, which can be closed on the front side by an annular stop on which a force is exerted and which is arranged such that it is movable in the axial direction of the contact rod. The free area, the inner and outer diameters of the sleeve, the pin diameter and the inner width of the enclosure all match each other in such a way that during the movement of the annular stop, the contact sleeve engages with the pin above and in the free region in order to complete the contacting process.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear contact device comprising:
   at least one first contact element and at least one second contact element which can be slid inside each other in a positive-locking manner, such that they can be connected to each other in an electrically conductive manner in order to create an electrically conductive connection;
   wherein the at least one first contact element comprises a first cup-like contact sleeve and the at least one second contact element comprises a contact pin that is surrounded by a hollow cylinder-like enclosure and is centrally arranged therein,
   wherein a peripheral free area is provided between the contact pin and the enclosure which can be closed on the front side by an annular stop on which a force is exerted and which is arranged such that it is displaceable in the axial direction of the contact pin, and
   wherein the free area, the inner and outer diameters of the sleeve, the pin diameter and inner width of the enclosure are matched to one another in such a way that during the displacement of the annular stop, the contact sleeve engages with the pin above and in the free area in order to complete the contacting process.

2. The contact device according to claim 1, wherein the respective contact element has a contact element housing made of electrically non-conductive plastic.

3. The contact device according to claim 1 wherein the enclosure of the second contact element is formed as part of the housing from electrically non-conductive or insulating plastic.

4. The contact device according to claim 1, wherein two or more guide elements for guiding and/or holding the annular stop are integrated into the housing and/or the enclosure of the second contact element, wherein the annular stop has complementary guide means for this purpose.

5. The contact device according to claim 4, wherein the guide element is a groove or recess which is arranged in the enclosure and is introduced into the enclosure and extends in the axial direction and/or a projection which runs radially around in the direction of the contact pin.

6. A low-voltage switchgear comprising at least one switchgear module and at least one contact device according to claim 1.

7. A low-voltage switchgear comprising the contact device according to claim 1.

* * * * *